United States Patent
Ohk et al.

(10) Patent No.: US 7,724,164 B2
(45) Date of Patent: May 25, 2010

(54) APPARATUS AND METHOD OF DYNAMICALLY CACHING SYMBOLS TO MANAGE A DICTIONARY IN A TEXT IMAGE CODING AND DECODING SYSTEM

(75) Inventors: Hyung-Soo Ohk, Seoul (KR); Jonghyon Yi, Yongin-si (KR); Charles A. Bouman, West Lafayette, IN (US); Maribel Figuera, Tora (ES)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 11/626,522

(22) Filed: Jan. 24, 2007

(65) Prior Publication Data

US 2008/0174459 A1 Jul. 24, 2008

(51) Int. Cl.
*H03M 7/00* (2006.01)
(52) U.S. Cl. .......................................... 341/106; 341/50
(58) Field of Classification Search .................... 341/50, 341/51, 106, 107; 382/132, 171
See application file for complete search history.

(56) References Cited

U.S. PATENT DOCUMENTS

| | | | |
|---|---|---|---|
| 4,410,916 A | 10/1983 | Pratt et al. | |
| 4,881,075 A | 11/1989 | Weng | |
| 5,524,066 A * | 6/1996 | Kaplan et al. | 382/229 |
| 5,646,617 A * | 7/1997 | Ohmoto et al. | 341/51 |
| 5,742,834 A * | 4/1998 | Kobayashi | 704/10 |
| 5,751,859 A * | 5/1998 | Howard | 382/238 |
| 6,188,385 B1 * | 2/2001 | Hill et al. | 345/614 |
| 6,664,902 B2 | 12/2003 | Andrew et al. | |
| 6,883,087 B1 * | 4/2005 | Raynaud-Richard et al. | 712/213 |
| 7,231,077 B2 * | 6/2007 | Eck et al. | 382/132 |

FOREIGN PATENT DOCUMENTS

| | | |
|---|---|---|
| JP | 06-152969 | 5/1994 |
| JP | 08-9165 | 1/1996 |
| JP | 09-246992 | 9/1997 |
| KR | 2006-56685 | 5/2006 |

OTHER PUBLICATIONS

European Search Report dated Apr. 16, 2008 issued in EP 08150510.9.

S. Subathra, M. Sethuraman and Vinosh Babu James—XP010890565—"Performance Analysis of Dictionary based Data Compression Alforithms for High Speed Networks", Dec. 2005.

(Continued)

*Primary Examiner*—Brian Young
(74) *Attorney, Agent, or Firm*—Stanzione & Kim, LLP

(57) ABSTRACT

An apparatus of a text image coding and decoding system includes a decomposer to decompose image data to extract a stripe image having one or more symbols, a matching unit to match the symbols with reference symbols of a symbol dictionary, and a dynamic symbol caching unit to generate one or more new symbols when the one or more new symbols of the symbols are not included in the symbol dictionary, and to remove the least used one or more of the reference symbols, so that the symbol dictionary is updated as an updated symbol dictionary with the one or more new symbols and without the least used one or more reference symbols.

33 Claims, 6 Drawing Sheets

OTHER PUBLICATIONS

Feregrino C.—XP010658571—Computer Science Department, National Institute for Astrophysics, Optics and Electronics, P.O. Box 51 and 216, Puebla. 72000, Mexico—"High Performance PPMC Compression Algorithm", Jun. 2003.

Craig G. Nevill-Manning and Ian H. Witten—XP010276618—"Phrase hierarchy inference and compression in bounded space", 1998.

Yan Ye and Pamela Cosman—XP011099242—"Fast and Memory Efficient Text Image Compression With JBIG2", 2003.

Yan Ye and Pamela Cosman—XP010802929—"Fast and Memory Efficient JBIG2 Encoder", 2001.

Fumitaka Ono-Rapporteur, SG, JBIG—"Liaison Reply to SG16 on draft Amendment 1 of T.89", Jun. 7, 2001.

* cited by examiner

APPARATUS AND METHOD OF DYNAMICALLY CACHING SYMBOLS TO MANAGE A DICTIONARY IN A TEXT IMAGE CODING AND DECODING SYSTEM

BACKGROUND OF THE INVENTION

1. Field of the Invention

The present invention relates to an apparatus and method of managing a dictionary composed of different symbols in a text image coding and decoding system, and more particularly, to an apparatus and method of dynamically caching symbols to manage a dictionary memory in a pattern matching based coding and decoding system.

2. Description of the Related Art

Generally, the JBIG2 standard, described in ITU-T T.88, defines a compression method for bi-level images, that is, images consisting of a single rectangular bit plane, with each pixel taking on one of just two possible colors. The JBIG2 standard only defines requirements for decoding a compliant bit stream corresponding to the images, and does not define a specific feature of an encoder design, but is flexible to many optimizations that can improve quality, compression, or speed of the encoder design.

In addition, the JBIG2 standard is the first international standard that provides for lossy, lossless, and lossy-to-lossless compression of the bi-level images, and supports multi-page images and model-based coding for text and halftones. The JBIG2 standard also permits compression ratios that are three to eight times better than previous standards, such as G3, G4, and JBIG1.

A bi-level document may contain one or more pages, and each page may contain text data, halftone data, and other data, such as line art or noise, as an input bi-level image. The JBIG2 encoder is expected to segment the input bi-level image into different regions, usually three regions, and to code each region separately using a different coding method. FIG. 1 is a view illustrating a composite image as an input image to be decomposed into three regions in the JBIG2 standard, such as a text region, a halftone region, and a generic region.

The JBIG2 standard includes encoding the text region of the input image using a symbol dictionary. The input image is split into horizontal stripes. Each stripe is scanned in raster order to extract connected components (symbols). Each symbol extracted is compared with reference symbols in the symbol dictionary. If a match is found between the symbol of the input page and the reference symbols of the symbol dictionary, the symbol of the input image is encoded using the following information: its location offset relative to its preceding symbols, a dictionary index pointing to its best match with the reference symbol in the symbol dictionary, and a refinement of an encoded bitmap of the symbol of the input image. If the match is not found, a new symbol corresponding to the unmatched symbol of the input image is added to the symbol dictionary. This pattern matching based coding system is known as Pattern Matching and Substitution (PM&S).

There exist several methods for the design of the symbol dictionary. The simplest one is a method that creates a completely different dictionary for each stripe encoded, without taking into account the symbols that were used to encode a previous stripe. This method is called an independent Dictionary. This method provides a poor compression ratio since a new dictionary must be encoded at each stripe. It is important to note that the symbols may be repeated from one stripe to another. Therefore, repeating symbols across different stripes has two disadvantages. First, these additional symbols increase computation due to the time taken to encode them. Second, retransmission of these redundant symbols of the independent dictionaries increases the overall bit rate of the encoding system.

The second one is a Global Dictionary method to take advantage of the fact that the symbols are repeated. This method uses a single dictionary to encode an entire multi-page document. Therefore, the Global Dictionary contains all the symbols necessary to encode all the stripes in the document. This method produces a high compression ratio. However, it is not feasible when there are memory limitations on the encoder or decoder. Moreover, the Global Dictionary method also increases the computation time because the symbol matching process requires a linear search through a much larger dictionary.

The third one is a Local Dictionary method which has been proposed by Ye and Cosman in the PhD dissertation "Text Image Compression Based on Pattern Matching", Yan Ye, 2002. The Local Dictionary method takes advantage of the fact that symbols may be repeated within consecutive stripes, and works as follows. At each stripe, the symbols from a previous dictionary that will not be used to encode a current stripe are removed, and the symbols that appear in the current stripe but did not find a match in the previous dictionary are added. The Local Dictionary method has disadvantages in that some symbols that are already stored in the dictionary and may be used in processing the next stripe are discarded. Typically, a compression ratio for the local dictionary method is higher than the Independent Dictionary method but much lower than the Global Dictionary method

SUMMARY OF THE INVENTION

The present general inventive concept provides a dynamic symbol caching apparatus and method of managing a dictionary composed of different symbols in a text image coding and decoding system.

The present general inventive concept provides an apparatus and method of dynamically caching symbols to manage a dictionary memory in a pattern matching based coding and decoding system The present general inventive concept provides a method of obtaining a high compression ratio comparable to that of a global dictionary while not exceeding a memory limit and maintaining a computational speed comparable to that of the local dictionary.

The present general inventive concept provides a caching algorithm to manage symbols stored in a dictionary with a limited memory space, and to determine which items to keep and which items to discard in order to make room for new symbols in the dictionary, when the dictionary is full.

Additional aspects and/or advantages of the present invention will be set forth in part in the description which follows and, in part, will be obvious from the description, or may be learned by practice of the present invention.

The foregoing and/or other aspects of the present invention may be achieved by providing an apparatus usable in a text image coding and decoding system, the apparatus including a decomposer to decompose image data to extract a stripe image having one or more symbols, a matching unit to match the symbols with reference symbols of a symbol dictionary, and a dynamic symbol caching unit to generate one or more new symbols when the one or more new symbols of the symbols are not included in the symbol dictionary, and to remove the least used one or more of the reference symbols, so that the symbol dictionary is updated as an updated symbol dictionary with the one or more new symbols and without the least used one or more reference symbols.

The apparatus may include a memory to store the symbols of the symbol dictionary, and the dynamic symbol caching unit may remove the least used one or more of the reference symbols according to a memory size of the memory and a volume of the updated symbol dictionary.

The memory may store access evens of the reference symbols of the symbol dictionary to determine the least used reference symbol.

The dynamic symbol caching unit may remove the least used one or more of the reference symbols according to access evens of the respective reference symbols of the symbol dictionary to determine the at least used reference symbol.

The dynamic symbol caching unit may add the one or more new symbols to the symbol dictionary to generate a second symbol dictionary, and removes the least used one or more of the reference symbols to generate the updated symbol dictionary.

The apparatus may include a coding unit to code the symbols according to index information on the updated symbol dictionary and location information on the respective symbols of the stripe image.

The apparatus may further include a transmitting unit to transmit the coded symbols using a wire or wireless network.

The apparatus may further include a decoding apparatus to receive the coded symbols to form the stripe image according to the index information on the updated symbol dictionary and the location information on the respective symbols of the stripe image.

The apparatus may further include a printing unit to print the formed stripe image on a printing medium.

The stripe image may include a previous stripe image and a current stripe image, the matching unit may match the symbols of the current stripe image with the symbol dictionary of the previous stripe image, and the dynamic symbol caching unit may generate the one or more new symbols of the symbols of the current stripe image when the one or more new symbols of the symbols of the current stripe image are not included in the reference symbols of the symbol dictionary of the previous stripe image, and to remove the least used one or more of the reference symbols, so that the symbol dictionary is updated as the updated symbol dictionary with the one or more new symbols and without the least used one or more reference symbols.

The stripe image may include a next stripe image, the matching unit matches the symbols of the next stripe image with the reference symbols of the updated symbol dictionary of the current stripe image, and the dynamic symbol caching unit generates one or more new symbols of the symbols of the next stripe image when the one or more new symbols of the symbols of the next stripe image are not included in the reference symbols of the updated symbol dictionary of the current stripe image, and to remove the least used one or more of the reference symbols from the reference symbols of the updated symbol dictionary of the current stripe image, so that the updated symbol dictionary is updated as another updated symbol dictionary with the one or more new symbols of the next stripe image and without the least used one or more reference symbols of the updated symbol dictionary.

The apparatus may further include a scanner to scan an image to generate the image data.

The decomposer may decompose the image date into a plurality of stripe images, the matching unit may match the symbols of one of the stripe images with reference symbols of a symbol dictionary, and the dynamic symbol caching unit may generate one or more new symbols of the one stripe image when the one or more new symbols are not included in the symbol dictionary, and may remove the least used one or more of the reference symbols, so that the symbol dictionary is updated as the updated symbol dictionary to be used for a next one of the stripe images.

The stripe image may include a plurality of stripe images, and the updated symbol dictionary may include a plurality of updated symbol dictionaries to correspond to the respective updated symbol dictionaries.

The apparatus may further include a coding unit to code the symbols of the respective stripe images according to index information on the respective updated symbol dictionaries and location information on the respective symbols of the respective stripe images.

The apparatus may further include a transmitting unit to transmit the coded symbols using a wire or wireless network.

The apparatus may further include a decoding apparatus to receive the coded symbols to form the stripe images according to the respective index information on the respective updated symbol dictionaries and the location information on the respective symbols of the stripe images.

The foregoing and/or other aspects of the present invention may also be achieved by providing an apparatus usable in a text image coding and decoding system, the apparatus including a decoding apparatus to receive coded symbols corresponding to respective stripe images together with respective index information on respective updated symbol dictionaries from which the least used one or more of reference symbols have been removed from the corresponding updated dictionaries, and location information on the respective symbols of the respective stripe images, and to form the respective stripe images according to the respective index information on the respective updated symbol dictionaries and the location information on the respective symbols of the stripe images.

The foregoing and/or other aspects of the present invention may also be achieved by providing a text image coding and decoding system, including an encoding apparatus to decompose image data to extract a stripe image having one or more symbols, to match the symbols with reference symbols of a symbol dictionary, and to generate one or more new symbols when the one or more new symbols of the symbols are not included in the symbol dictionary, and to remove the least used one or more of the reference symbols, so that the symbol dictionary is updated as an updated symbol dictionary with the one or more new symbols and without the least used one or more reference symbols, and a decoding apparatus to receive index information on the updated symbol dictionary from which the least used one or more of reference symbols have been removed, and location information on the respective symbols of the stripe image, and to form the stripe image according to the index information on the updated symbol dictionary and the location information on the respective symbols of the stripe image.

The foregoing and/or other aspects of the present invention may also be achieved by providing an apparatus to code a text image using a pattern matching method in a text image coding and decoding system, the apparatus including a decomposer to decompose image data to extract a stripe image having one or more symbols with information on access events corresponding to the respective symbols, a pattern matching unit to match the symbols with reference symbols of a symbol dictionary, and a dynamic symbol caching unit to generate one or more new symbols when the one or more new symbols of the symbols are not included in the symbol dictionary, and to remove one or more of the reference symbols having the least access events, so that the symbol dictionary is updated as an updated symbol dictionary with the one or more new symbols and without the one or more of the reference symbols having the at least access event.

The one or more of the reference symbols having the least access event may include the one or more of the reference symbols having the least used symbol.

The foregoing and/or other aspects of the present invention may also be achieved by providing an apparatus to code a text image using a pattern matching method in a text image coding and decoding system, the apparatus including a decomposer to decompose image data to extract a stripe image having one or more symbols, a matching unit to match the symbols with reference symbols of a symbol dictionary, and a dynamic symbol caching unit to generate one or more new symbols when the one or more new symbols of the symbols are not included in the symbol dictionary, to update the symbol dictionary as a second symbol dictionary with the one or more new symbols, and to remove the least used one or more of the reference symbols from the second symbol dictionary to generate a third symbol dictionary without the removed the least used one or more reference symbols.

The apparatus may include a memory to store at least one of the symbol dictionary, the second symbol dictionary, and the third symbol dictionary, and the dynamic symbol caching unit may compare a capacity of the memory with a volume of the second symbol dictionary, and may remove the least used one or more of the reference symbols from the second symbol dictionary to generate the third symbol dictionary having another volume less than the capacity of the memory.

The foregoing and/or other aspects of the present invention may also be achieved by providing a method of a text image coding and decoding system, the method including decomposing image data to extract a stripe image having one or more symbols, matching the symbols with reference symbols of a symbol dictionary, generating one or more new symbols when the one or more new symbols of the symbols are not included in the symbol dictionary, and removing the least used one or more of the reference symbols, so that the symbol dictionary is updated as an updated symbol dictionary with the one or more new symbols and without the least used one or more reference symbols.

The foregoing and/or other aspects of the present invention may also be achieved by providing a method of a text image coding and decoding system, the method including decomposing image data to extract a stripe image having one or more symbols, matching the symbols with reference symbols of a symbol dictionary, generating one or more new symbols when the one or more new symbols of the symbols are not included in the symbol dictionary, removing the least used one or more of the reference symbols, so that the symbol dictionary is updated as an updated symbol dictionary with the one or more new symbols and without the least used one or more reference symbols, receiving index information on the updated symbol dictionary from which the least used one or more of reference symbols have been removed, and location information on the respective symbols of the stripe image, and forming the stripe image according to the index information on the updated symbol dictionary and the location information on the respective symbols of the stripe image.

The foregoing and/or other aspects of the present invention may also be achieved by providing a method of a text image using a pattern matching method in a text image coding and decoding system, the method including decomposing image data to extract a stripe image having one or more symbols, matching the symbols with reference symbols of a symbol dictionary, generating one or more new symbols when the one or more new symbols of the symbols are not included in the symbol dictionary; updating the symbol dictionary as a second symbol dictionary with the one or more new symbols, and removing the least used one or more of the reference symbols from the second symbol dictionary to generate a third symbol dictionary without the removed the least used one or more reference symbols.

The foregoing and/or other aspects of the present invention may also be achieved by providing a computer readable recording medium containing computer readable codes as a program to execute a method in a text image coding and decoding system, the method including decomposing image data to extract a stripe image having one or more symbols, matching the symbols with reference symbols of a symbol dictionary, generating one or more new symbols when the one or more new symbols of the symbols are not included in the symbol dictionary, and removing the least used one or more of the reference symbols, so that the symbol dictionary is updated as an updated symbol dictionary with the one or more new symbols and without the least used one or more reference symbols.

The foregoing and/or other aspects of the present invention may also be achieved by providing a computer readable recording medium containing computer readable codes as a program to execute a method in a text image coding and decoding system, the method including decomposing image data to extract a stripe image having one or more symbols, matching the symbols with reference symbols of a symbol dictionary, generating one or more new symbols when the one or more new symbols of the symbols are not included in the symbol dictionary, removing the least used one or more of the reference symbols, so that the symbol dictionary is updated as an updated symbol dictionary with the one or more new symbols and without the least used one or more reference symbols, receiving index information on the updated symbol dictionary from which the least used one or more of reference symbols have been removed, and location information on the respective symbols of the stripe image, and forming the stripe image according to the index information on the updated symbol dictionary and the location information on the respective symbols of the stripe image.

The foregoing and/or other aspects of the present invention may also be achieved by providing a computer readable recording medium containing computer readable codes as a program to execute a method in a text image coding and decoding system, the method including decomposing image data to extract a stripe image having one or more symbols, matching the symbols with reference symbols of a symbol dictionary, generating one or more new symbols when the one or more new symbols of the symbols are not included in the symbol dictionary, updating the symbol dictionary as a second symbol dictionary with the one or more new symbols, and removing the least used one or more of the reference symbols from the second symbol dictionary to generate a third symbol dictionary without the removed the least used one or more reference symbols.

The foregoing and/or other aspects of the present invention may also be achieved by providing an apparatus usable in a text image coding and decoding system, the apparatus including a decomposer to decompose the image data to extract a plurality of stripe images each having one or more symbols, a matching unit to match the symbols of the respective stripe images with reference symbols of a symbol dictionary, and a dynamic symbol caching unit to update the symbol dictionary as an updated symbol dictionary to include the symbols of the respective stripe images, and to remove the least used one of the reference symbols from the updated symbol dictionary to reduce a volume of the updated symbol dictionary.

The foregoing and/or other aspects of the present invention may also be achieved by providing an apparatus usable in a text image coding and decoding system, the apparatus including a decomposer to decompose the image data to extract a plurality of stripe images each having one or more symbols, a matching unit to match the symbols of the respective stripe images with reference symbols of a symbol dictionary, and a dynamic symbol caching unit to update the symbol dictionary as an updated symbol dictionary to include the symbols of the respective stripe images, and to remove the least accessed one of the reference symbols from the updated symbol dictionary according to a volume of the updated symbol dictionary.

The foregoing and/or other aspects of the present invention may also be achieved by providing an apparatus usable in a text image coding and decoding system, the apparatus including a decomposer to decompose the image data to extract a plurality of stripe images each having one or more symbols and access information corresponding to the respective symbols, a matching unit to match the symbols of the respective stripe images with reference symbols of a symbol dictionary, and a dynamic symbol caching unit to cache the symbols to update the symbol dictionary as an updated symbol dictionary to include the symbols of the respective stripe images as the reference symbols of the updated symbol dictionary, to remove the least accessed one of the reference symbols from the updated symbol dictionary, and to update the access information of the symbols of the updated symbol dictionary according to overlap of the symbols of the respective stripe images and the reference symbols of the symbol dictionary, such the updated access information is used to remove the at least accessed one of the reference symbols.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
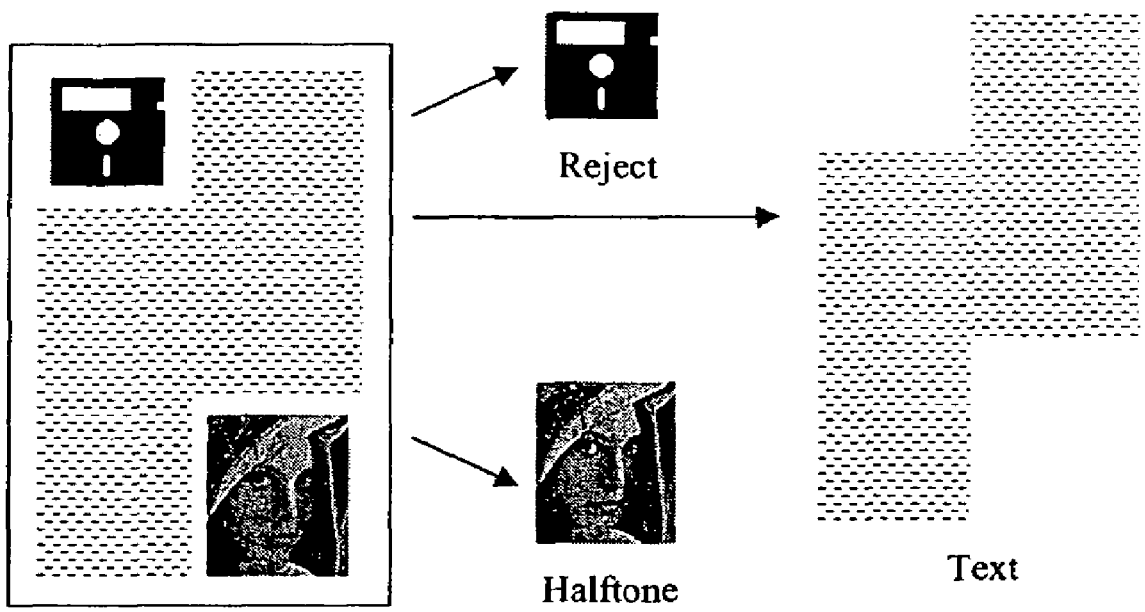
FIG. 1 is a schematic view an input image divided into three regions in a conventional image encoding and decoding system.

Reference will now be made in detail to the embodiments of the present invention, examples of which are illustrated in the accompanying drawings, wherein like reference numerals refer to like elements throughout.

A caching algorithm which can be used in a text image coding and decoding system will be described hereinafter. The caching algorithm includes a method that predicts when a symbol will be used. Examples of the caching algorithm may be the Least Recently Used (LRU) algorithm, which discards the least recently used items first, and also the Pseudo-LRU algorithm or Tree-LRU which is an efficient algorithm to find an item that most likely has not been accessed very recently, given a set of items and a sequence of access events to the items. Another caching algorithm may be the Least Frequently Used (LFU) algorithm, which counts how often an item is needed and those that are used least often are discarded first. Here, the LRU algorithm may be used in the text image coding and decoding system as an example. However, the present general inventive concept is not limited thereto. For example, any variations of any of caching algorithms mentioned above are also used as the caching algorithm that can be used in the text image coding and decoding system according to an embodiment of the present general inventive concept.

Figure 2:
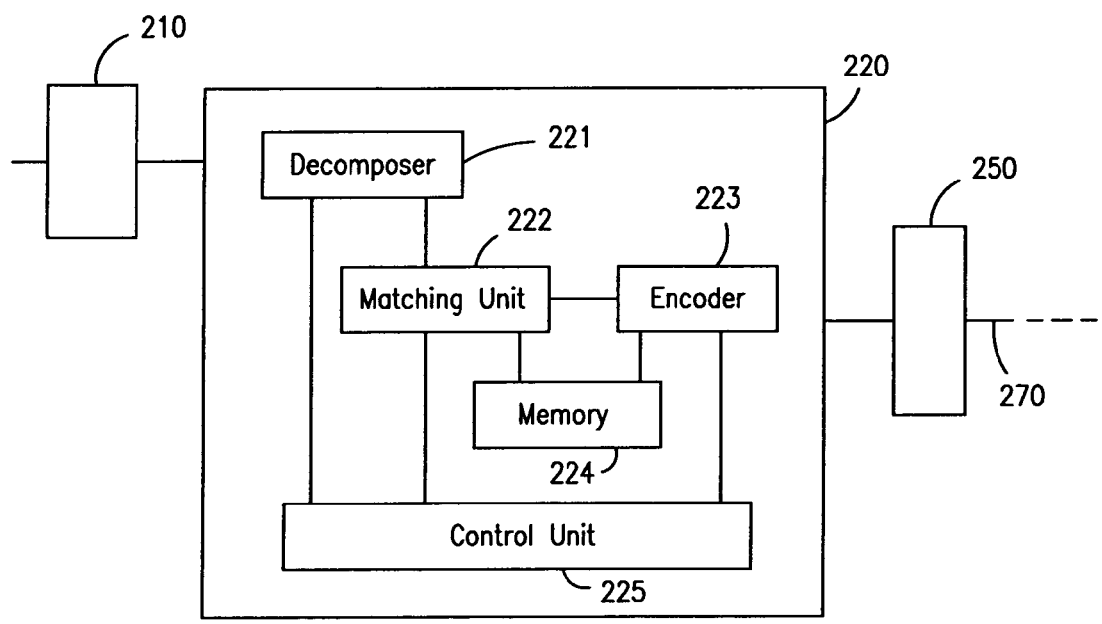
FIG. 2 is a diagram illustrating an apparatus usable with a text image coding and decoding system according to an embodiment of the present general inventive concept.
Figure 2:
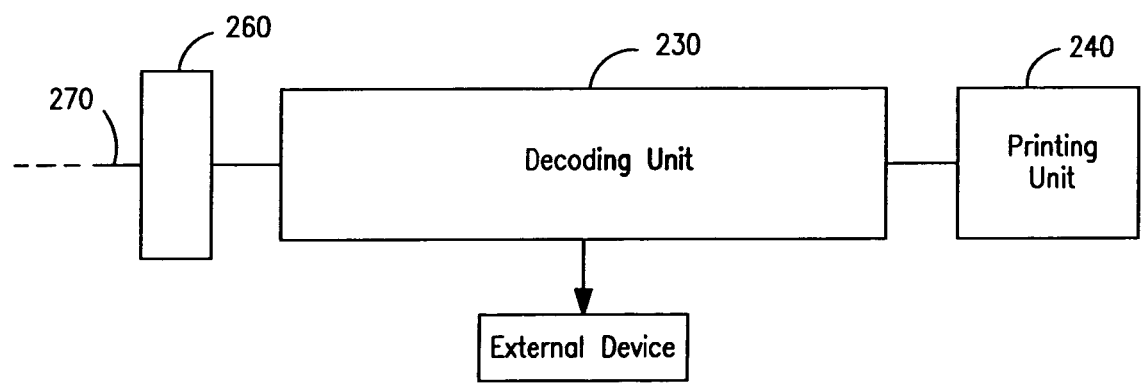

FIG. 2 is a diagram illustrating an apparatus usable with a text image coding and decoding system 200 according to an embodiment of the present general inventive concept. Referring to FIG. 2, the apparatus may include a scanner 210, an encoding unit 220, a decoding unit 230, and a printing unit 240. The apparatus may further include transmitting and/or receiving units 250 and 260 to transmit an encoded signal (data) and/or receive the encoded signal (data) between the encoding unit 220 and the decoding unit 230 through a circuit, a wire network, or a wireless network 270.

The encoding unit 220 may include a decomposer 221, a matching unit 222, a coder or encoder 223, a memory 224, and a control unit 225. The control unit 225 may constitute a dynamic symbol caching (DSC) unit to dynamically cache symbols to manage a memory space of, for example, the memory 224. It is possible that the control unit 225, the memory unit 224, and/or other components of the encoding unit 220 may constitute the DSC unit. The decomposer 221 and the encoding unit 220 may constitute an encoding apparatus. The encoding unit apparatus may include the scanner 210. The decoding unit 230 and the printing unit 240 may constitute a decoding apparatus. The text image coding and decoding system 200 may include the encoding apparatus and the decoding apparatus, and may be an image forming apparatus, such as a facsimile, a multi-functional apparatus, etc.

The scanner 210 may include a scanning unit to emit light toward a document, to receive the light reflected from the document, and to generate an input signal corresponding to a scanned image from the received light as an input image (or image data). A conventional scanner may be used as the scanner 210.

The composer 221 decomposes the input signal into binary image signals (bi-level image signals) representing three different regions, such as a text region, a halftone region, and a generic region. Here, the composer 221 may include a divider to divide or split the text region into one or more stripes and also may include an extractor to extract one or more symbols from each of the stripes (or stripe images). Each stripe may be a portion of the test region scanned in raster order to extract connected components as the symbols.

The matching unit 222 compares the symbols with reference symbols of a dictionary (or symbol dictionary) stored in the memory 224 to determine whether the respective symbols match with the reference symbols of the dictionary of the memory 224.

The coder 223 codes each region separately using a different coding method. That is, the coder 223 encodes the text region using the symbol dictionary and a result of the matching unit 222. For example, the coder 223 encodes the symbols according to location information of the symbol relative to a preceding symbol, dictionary index information on a best match between the symbol and the reference symbol in the symbol dictionary, and refinement information on an encoded bitmap of the symbol of the input image, as an encoded signal. According to pattern matching and substitution (PM&S), if the match is not found, a new symbol corresponding to the unmatched symbol is added to the symbol dictionary. The coder 223 also encodes the test region as describe above, the halftone region, and the generic region, as the encoded signal.

The control unit 225 controls the decomposer 221, the matching unit 222, the coder, and the memory 224 to generate one or more new symbols when the one or more new symbols of the symbols are not included in the symbol dictionary, and to remove the least used one or more of the reference symbols in previous matching processes, so that the symbol dictionary is updated as an updated symbol dictionary with the one or more new symbols and without the least used one or more reference symbols.

When the memory 224 includes information on access events corresponding to reference symbols, the control unit 225 may generate one or more new symbols when the one or more new symbols of the symbols are not included in the symbol dictionary, and remove one or more of the reference symbols having at least one of the access events, so that the symbol dictionary is updated as an updated symbol dictionary with the one or more new symbols and without the one or more of the reference symbols having the least access event.

The control unit 225 may generate one or more new symbols when the one or more new symbols of the symbols are not included in the symbol dictionary, update the symbol dictionary as a second symbol dictionary with the one or more new symbols, and remove the least used one or more of the reference symbols from the second symbol dictionary to generate a third symbol dictionary without the removed the least used one or more reference symbols.

The control unit 225 may update the symbol dictionary as an updated symbol dictionary to include the symbols of the respective stripe images, and to remove the least used one of the reference symbols from the updated symbol dictionary to reduce the memory of the updated symbol dictionary.

The control unit 225 may update the symbol dictionary as an updated symbol dictionary to include the symbols of the respective stripe images, and remove the least accessed one of the reference symbols from the updated symbol dictionary according to the updated symbol dictionary memory.

The control unit 225 may cache the symbols to update the symbol dictionary as an updated symbol dictionary to include the symbols of the respective stripe images as the reference symbols of the updated symbol dictionary, remove at least accessed one of the reference symbols from the updated symbol dictionary, and update the access information of the symbols of the updated symbol dictionary according to overlap of the symbols of the respective stripe images and the reference symbols of the symbol dictionary, such the updated access information is used to remove the at least accessed one of the reference symbols.

The decoding unit 230 receives the encoded signal including the coded symbols to form the stripe images according to the respective index information on the respective updated symbol dictionaries and the location information on the respective symbols of the stripe images.

The decoding unit 230 may receive coded symbols corresponding to respective stripe images together with respective index information on respective updated symbol dictionaries from which the least used one or more of reference symbols have been removed from the corresponding updated dictionaries, and location information on the respective symbols of the respective stripe images, and then form or reproduce the respective stripe images according to the respective index information on the respective updated symbol dictionaries and the location information on the respective symbols of the stripe images.

The decoding unit 230 may receive index information on the updated symbol dictionary from which the least used one or more of reference symbols have been removed, and location information on the respective symbols of the stripe image, and to form the stripe image according to the index information on the updated symbol dictionary and the location information on the respective symbols of the stripe image.

The decoding unit 230 may output data decoded therefrom, and the printing unit 240 may print the output data including the formed strips including the symbols on a printing medium. The decoding unit 230 may output the decoded data or text image data to an external device through a circuit, a wire network, or a wireless network. The printing unit 240 may be an inkjet print unit to eject ink droplets on the printing medium using one or more inkjet heads having one or more ink nozzles, a laser beam printing unit to form a latent image using a laser beam and to develop the latent image with a developer, such as toner, etc.

According to present embodiment, the text image coding and decoding system 200 includes the encoding apparatus to decompose image data to extract a stripe image having one or more symbols, to match the symbols with reference symbols of a symbol dictionary, and to generate one or more new symbols when the one or more new symbols of the symbols are not included in the symbol dictionary, and to remove the least used one or more of the reference symbols, so that the symbol dictionary is updated as an updated symbol dictionary with the one or more new symbols and without the least used one or more reference symbols.

According to present embodiment, the text image coding and decoding system 200 can also include the decoding apparatus to receive index information on the updated symbol dictionary from which the least used one or more of reference symbols have been removed, and location information on the respective symbols of the stripe image, and to form the stripe image according to the index information on the updated symbol dictionary and the location information on the respective symbols of the stripe image.

Figure 3:
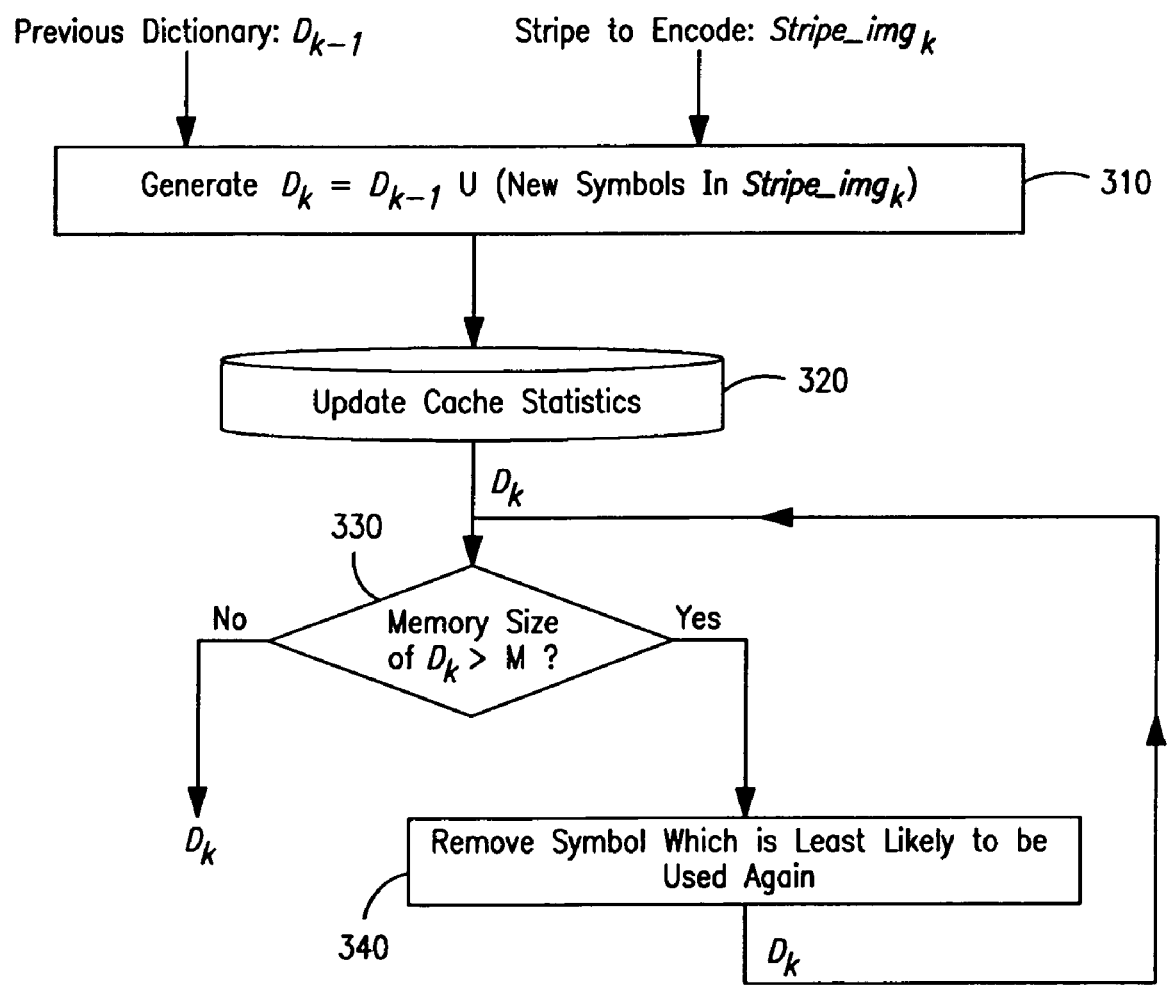
FIG. 3 is a flowchart illustrating a method of a text image coding and decoding system according to an embodiment of the present general inventive concept.

FIG. 3 is a flowchart illustrating a method of a text image coding and decoding system according to an embodiment of the present general inventive concept. Referring to FIGS. 2 and 3, the method performs a dynamic symbol caching (DSC) method of managing a symbol. dictionary.

At time k, an old dictionary $D_{k-1}$ is stored in the memory 224, and a new image (or an image of a stripe) to be encoded is stripe_$img_k$. At operation 310, when one or more new symbols in the new image stripe_$img_k$ do not find a match with the reference symbols in the dictionary $D_{k-1}$ the one or more new symbols are added to the old dictionary $D_{k-1}$ to create a new dictionary $D_k$.

At operation 320, information on the added one or more symbols of the new dictionary $D_{k-1}$ and the reference symbols of the old dictionary $D_{k-1}$ is updated and stored in the memory 224 according to a caching algorithm since the information varies depending on the caching algorithm. That is, cache statistics is updated to correspond to the added one or more symbols of the new dictionary $D_{k-1}$ and the reference symbols of the old dictionary $D_{k-1}$. If a least recently used (LRU) algorithm is used as the caching algorithm, the control unit 225 updates the last time that a symbol appeared on a stripe for all the symbols in the dictionary. If a least frequently used (LFU) algorithm is used as the caching algorithm, the control unit 225 updates the number of times that each symbol in the dictionary has been used until now. The present general inventive concept is not limited thereto. Other caching methods can be used as the caching method.

At operation 330, once the new dictionary $D_k$ is formed, the control unit 225 checks if the memory 224 used by the new dictionary $D_k$ is greater than a threshold M.

At operation 340, if the memory 224 used by the dictionary is greater than a threshold M, the control unit 225 uses the caching algorithm to discard or remove one or more reference symbols in the new dictionary $D_k$ until the memory 224 used by the dictionary is not greater than the threshold M. The removed one or more reference symbols are selected according to the caching algorithm, for example, the LRU or LFU algorithm.

According to the present embodiment, the DSC method efficiently utilizes and manages a limited memory space of a memory device to store a dictionary. This method allows retaining the symbols in the old dictionary $D_{k-1}$ that are most likely to be used in the future while not exceeding the limited memory space available for the dictionary. Since the method retains the most likely used symbols, the method does not need to encode them again, which translates into a major increase of a compression ratio. Therefore, the present embodiment enables the DSC unit to increase significantly the compression ratio while reducing a computation time.

Figure 4:
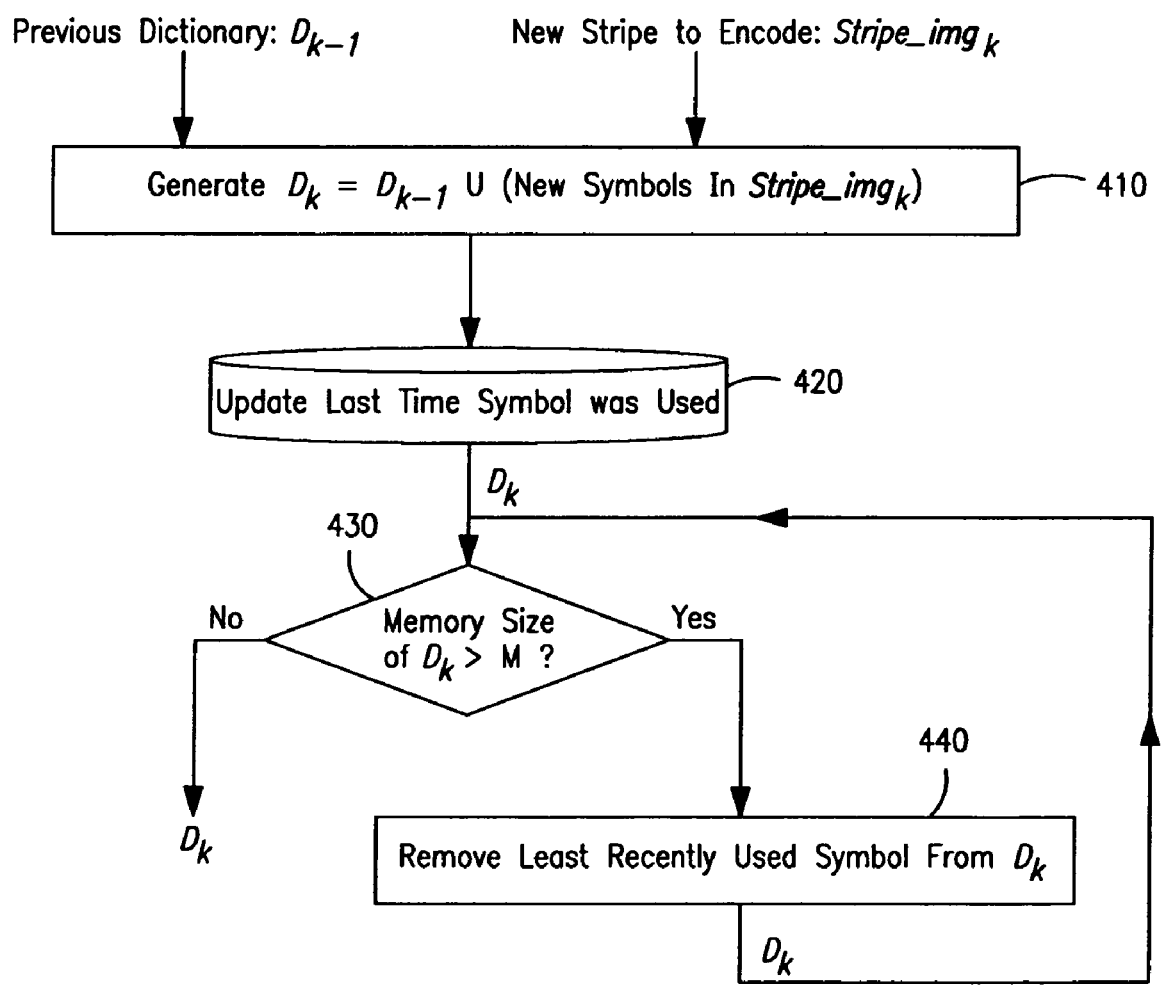
FIG. 4 is a flowchart illustrating a method of a text image coding and decoding system according to an embodiment of the present general inventive concept.

FIG. 4 is a flowchart illustrating a method of a text image coding and decoding system according to an embodiment of the present general inventive concept. Referring to FIGS. 3 and 4, operations 410 and 430 of FIG. 4 are similar to operations of FIG. 3, and the corresponding descriptions are omitted.

At operation 420, the control unit 225 update the new dictionary $D_k$ with a last time used symbol, and at operation 440 a least recently used symbol is removed from the new dictionary $D_k$. The least recently used symbol has been included in the old dictionary $D_{k-1}$.

According to present embodiment, a method of a text image coding and decoding system 200 includes decomposing image data to extract a stripe image having one or more symbols; matching the symbols with reference symbols of a symbol dictionary, generating one or more new symbols when the one or more new symbols of the symbols are not included in the symbol dictionary, removing the least used one or more of the reference symbols, so that the symbol dictionary is updated as an updated symbol dictionary with the one or more new symbols and without the least used one or more reference symbols, receiving index information on the updated symbol dictionary from which the least used one or more of reference symbols have been removed, and location information on the respective symbols of the stripe image, and forming the stripe image according to the index information on the updated symbol dictionary and the location information on the respective symbols of the stripe image.

We applied the above described method to the JBIG2 to encode a bi-level document including 23 binary images. In this case, the DSC method was used to manage the symbols stored in the dictionary. We have a unique dictionary that gets updated at each stripe and a cache that keeps track of when each symbol was used for the last time. The LRU caching algorithm was used to decide which symbols need to be discarded and which need to be kept in the dictionary. This algorithm adaptively identifies and caches the symbols that are most recently used.

We encoded the 23 page document using three algorithms: Independent Dictionary, Local Dictionary, and Dynamic Symbol Caching. Each page is a bi-level image with the following features:
Dimension: 2560×3280
Resolution: 300 dpi
Size: 1,049,662 bytes
Skew FIG. 5 is a view illustrating compression ratios of a conventional image encoding and decoding system and a text image coding and decoding system according to an embodiment of the present general inventive concept, and FIG. 6 is a view illustrating graphs of elapsed times of a conventional image encoding and decoding system and a text image coding and decoding system according to an embodiment of the present general inventive concept.

Figure 5:
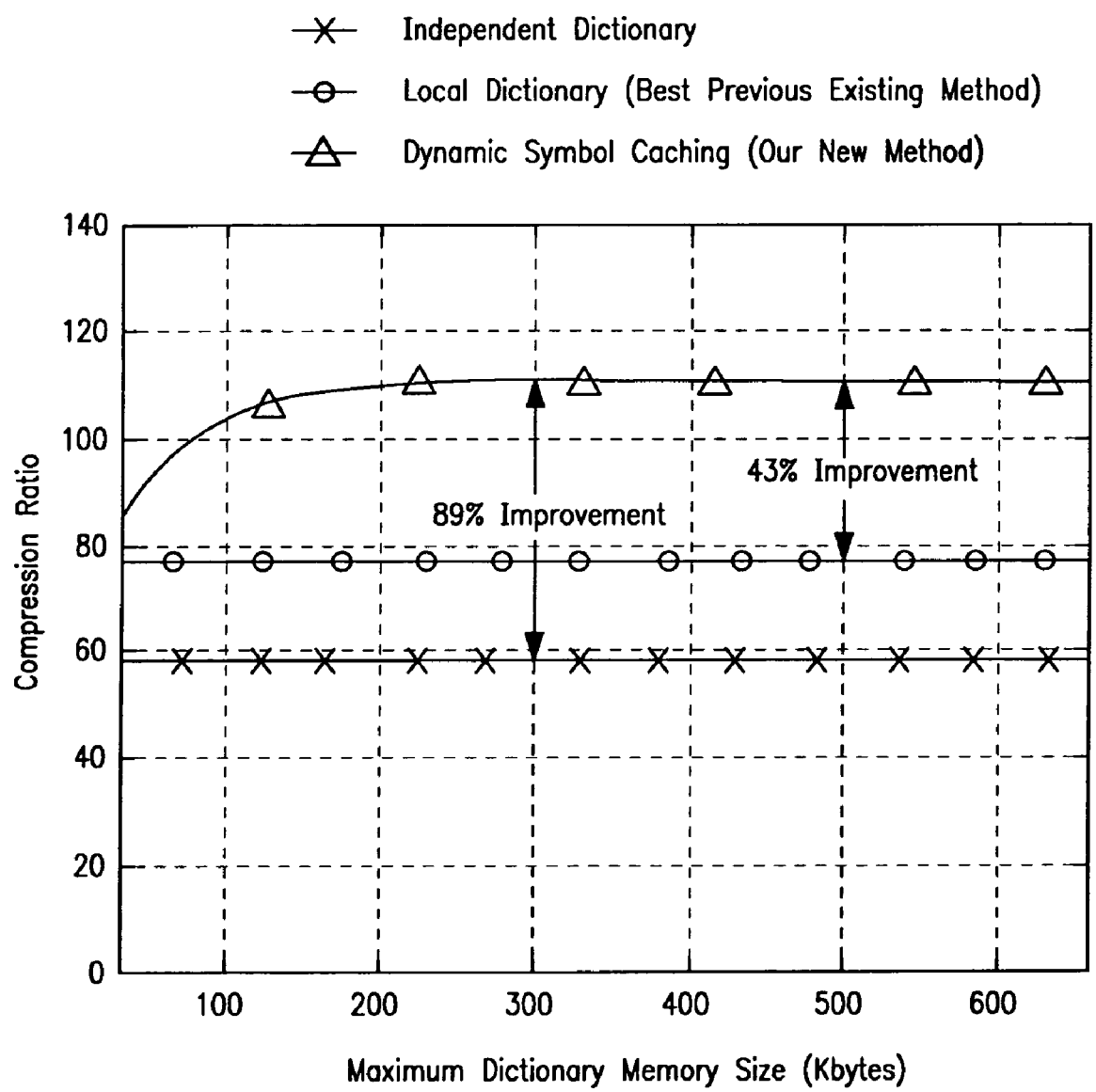
FIG. 5 is a view illustrating compression ratios of a conventional image encoding and decoding system and a text image coding and decoding system according to an embodiment of the present general inventive concept.
Figure 6:
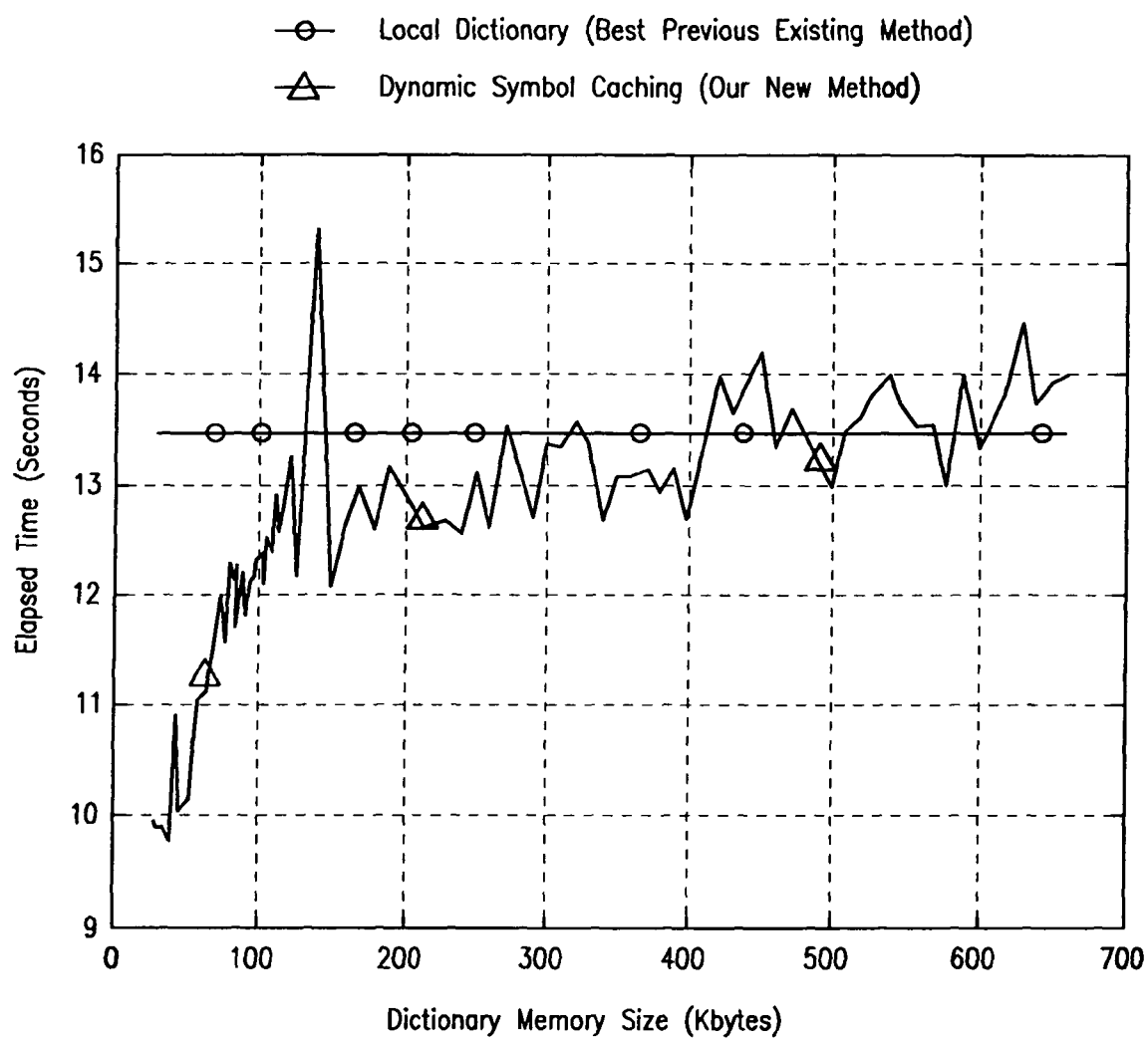
FIG. 6 is a view illustrating graphs of elapsed times of a conventional image encoding and decoding system and a text image coding and decoding system according to an embodiment of the present general inventive concept.

Referring to FIG. 5, the present embodiment of the DSC method provides 89% increase of a compression ratio over a conventional independent dictionary and 43% increase of a compression ratio over a conventional local dictionary method, while a speed of the algorithm of the DSC method is maintained as illustrated in FIG. 6.

The present general inventive concept can also be embodied as computer-readable codes as programs on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, the present general inventive concept provides a DSC apparatus and method of managing a dictionary composed of different symbols. Text images are a special type of a binary image because they contain many repeated text characters, hence being highly redundant at the character level. Text image compression methods, such as JBIG2, can take advantage of this redundancy by coding the text based on pattern matching techniques. In a pattern matching based coding system, rather than coding all the character bitmaps (called symbols) in the input image pixel by pixel, the encoder first selects a representative subset of symbols from all symbols and transmits them as the dictionary.

As described above, the present general inventive concept provides a design of the dictionary to obtain an efficient compression algorithm and a high compression ratio. The present general inventive concept also provides caching algorithms for memory management to fully utilize the limited memory of the dictionary. Furthermore, the present general inventive concept also provides Dynamic Symbol Caching for Memory Management which is useful for any coding method that uses a symbol dictionary and thus needs a cache where to store all the different symbols. This new technique, compared to conventional methods, greatly improves the compression ratio while preserving the performance of the encoder; here we use JBIG2 as an example application where the dynamic symbol caching method is beneficial Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed:

1. An apparatus usable in a text image coding and decoding system, comprising:
a decomposer to decompose image data to extract a stripe image having one or more symbols;
a matching unit to match the symbols with reference symbols of a symbol dictionary;
a dynamic symbol caching unit to generate one or more new symbols when the one or more new symbols of the symbols are not included in the symbol dictionary, and to remove the least used one or more of the reference symbols, so that the symbol dictionary is updated as an updated symbol dictionary with the one or more new symbols and without the least used one or more reference symbols.

2. The apparatus of claim 1, further comprising:
a memory to store the symbols of the symbol dictionary,
wherein the dynamic symbol caching unit removes the least used one or more of the reference symbols according to a memory size of the memory and a volume of the updated symbol dictionary.

3. The apparatus of claim 2, wherein the memory stores access evens of the reference symbols of the symbol dictionary to determine the least used reference symbol.

4. The apparatus of claim 1, wherein the dynamic symbol caching unit removes the least used one or more of the reference symbols according to access evens of the respective reference symbols of the symbol dictionary to determine the least used reference symbol.

5. The apparatus of claim 1, wherein the dynamic symbol caching unit adds the one or more new symbols to the symbol dictionary to generate a second symbol dictionary, and removes the least used one or more of the reference symbols to generate the updated symbol dictionary.

6. The apparatus of claim 1, further comprising:
a coding unit to code the symbols according to index information on the updated symbol dictionary and location information on the respective symbols of the stripe image.

7. The apparatus of claim 6, further comprising
a transmitting unit to transmit the coded symbols using a wire or wireless network.

8. The apparatus of claim 6, further comprising:
a decoding apparatus to receive the coded symbols to form the stripe image according to the index information on the updated symbol dictionary and the location information on the respective symbols of the stripe image.

9. The apparatus of claim 7, further comprising:
a printing unit to print the formed stripe image on a printing medium.

10. The apparatus of claim 1, wherein:
the stripe image comprises a previous stripe image and a current stripe image;
the matching unit matches the symbols of the current stripe image with the symbol dictionary of the previous stripe image; and
the dynamic symbol caching unit generates the one or more new symbols of the symbols of the current stripe image when the one or more new symbols of the symbols of the current stripe image are not included in the reference symbols of the symbol dictionary of the previous stripe image, and to remove the least used one or more of the reference symbols, so that the symbol dictionary is updated as the updated symbol dictionary with the one or more new symbols and without the least used one or more reference symbols.

11. The apparatus of claim 10, wherein:
the stripe image comprises a next stripe image;
the matching unit matches the symbols of the next stripe image with the reference symbols of the updated symbol dictionary of the current stripe image; and
the dynamic symbol caching unit generates one or more new symbols of the symbols of the next stripe image when the one or more new symbols of the symbols of the next stripe image are not included in the reference symbols of the updated symbol dictionary of the current stripe image, and to remove the least used one or more of the reference symbols from the reference symbols of the updated symbol dictionary of the current stripe image, so that the updated symbol dictionary is updated as another updated symbol dictionary with the one or more new symbols of the next stripe image and without the least used one or more reference symbols of the updated symbol dictionary.

12. The apparatus of claim 1, further comprising:
a scanner to scan an image to generate the image data.

13. The apparatus of claim 12, wherein:
the decomposer decomposes the image data into a plurality of stripe images;
the matching unit matches the symbols of one of the stripe images with reference symbols of a symbol dictionary;
the dynamic symbol caching unit generates one or more new symbols of the one stripe image when the one or more new symbols are not included in the symbol dictionary, and to remove the least used one or more of the reference symbols, so that the symbol dictionary is updated as the updated symbol dictionary to be used for a next one of the stripe images.

14. The apparatus of claim 1, wherein:
the stripe image comprises a plurality of stripe images; and
the updated symbol dictionary comprises a plurality of updated symbol dictionaries to correspond to the respective updated symbol dictionaries.

15. The apparatus of claim 14, further comprising:
a coding unit to code the symbols of the respective stripe images according to index information on the respective updated symbol dictionaries and location information on the respective symbols of the respective stripe images.

16. The apparatus of claim 15, further comprising
a transmitting unit to transmit the coded symbols using a wire or wireless network.

17. The apparatus of claim 16, further comprising:
a decoding apparatus to receive the coded symbols to form the stripe images according to the respective index information on the respective updated symbol dictionaries and the location information on the respective symbols of the stripe images.

18. An apparatus usable in a text image coding and decoding system, comprising:
a decoding apparatus to receive coded symbols corresponding to respective stripe images together with respective index information on respective updated symbol dictionaries from which the least used one or more of reference symbols have been removed from the corresponding updated dictionaries, and location information on the respective symbols of the respective stripe images, and to form the respective stripe images according to the respective index information on the respective updated symbol dictionaries and the location information on the respective symbols of the stripe images.

19. A text image coding and decoding system, comprising:
an encoding apparatus to decompose image data to extract a stripe image having one or more symbols, to match the symbols with reference symbols of a symbol dictionary, and to generate one or more new symbols when the one or more new symbols of the symbols are not included in the symbol dictionary, and to remove the least used one or more of the reference symbols, so that the symbol dictionary is updated as an updated symbol dictionary with the one or more new symbols and without the least used one or more reference symbols; and
a decoding apparatus to receive index information on the updated symbol dictionary from which the least used one or more of reference symbols have been removed, and location information on the respective symbols of the stripe image, and to form the stripe image according to the index information on the updated symbol dictionary and the location information on the respective symbols of the stripe image.

20. An apparatus to code a text image using a pattern matching method in a text image coding and decoding system, comprising:
a decomposer to decompose image data to extract a stripe image having one or more symbols with information on access events corresponding to the respective symbols;
a pattern matching unit to match the symbols with reference symbols of a symbol dictionary; and
a dynamic symbol caching unit to generate one or more new symbols when the one or more new symbols of the symbols are not included in the symbol dictionary, and to remove one or more of the reference symbols having the least one of the access events, so that the symbol dictionary is updated as an updated symbol dictionary with the one or more new symbols and without the one or more of the reference symbols having the least access event.

21. The apparatus of claim 20, wherein the one or more of the reference symbols having the least one of the access events comprise the one or more of the reference symbols having the least used symbol.

22. An apparatus to code a text image using a pattern matching method in a text image coding and decoding system, comprising:
a decomposer to decompose image data to extract a stripe image having one or more symbols;
a matching unit to match the symbols with reference symbols of a symbol dictionary; and
a dynamic symbol caching unit to generate one or more new symbols when the one or more new symbols of the symbols are not included in the symbol dictionary, to update the symbol dictionary as a second symbol dictionary with the one or more new symbols, and to remove the least used one or more of the reference symbols from the second symbol dictionary to generate a third symbol dictionary without the removed the least used one or more reference symbols.

23. The apparatus of claim 22, further comprising:
a memory to store at least one of the symbol dictionary, the second symbol dictionary, and the third symbol dictionary,
wherein the dynamic symbol caching unit compares a capacity of the memory with a volume of the second symbol dictionary, and removes the least used one or more of the reference symbols from the second symbol dictionary to generate the third symbol dictionary having another volume less than the capacity of the memory.

24. A method of a text image coding and decoding system, comprising:
decomposing image data to extract a stripe image having one or more symbols;
matching the symbols with reference symbols of a symbol dictionary;
generating one or more new symbols when the one or more new symbols of the symbols are not included in the symbol dictionary; and
removing the least used one or more of the reference symbols, so that the symbol dictionary is updated as an updated symbol dictionary with the one or more new symbols and without the least used one or more reference symbols.

25. A method of a text image coding and decoding system, the method comprising:
decomposing image data to extract a stripe image having one or more symbols;
matching the symbols with reference symbols of a symbol dictionary;
generating one or more new symbols when the one or more new symbols of the symbols are not included in the symbol dictionary;
removing the least used one or more of the reference symbols, so that the symbol dictionary is updated as an updated symbol dictionary with the one or more new symbols and without the least used one or more reference symbols;
receiving index information on the updated symbol dictionary from which the least used one or more of reference symbols have been removed, and location information on the respective symbols of the stripe image; and
forming the stripe image according to the index information on the updated symbol dictionary and the location information on the respective symbols of the stripe image.

26. A method of a text image using a pattern matching method in a text image coding and decoding system, the method comprising:
decomposing image data to extract a stripe image having one or more symbols;
matching the symbols with reference symbols of a symbol dictionary; and
generating one or more new symbols when the one or more new symbols of the symbols are not included in the symbol dictionary;
updating the symbol dictionary as a second symbol dictionary with the one or more new symbols; and
removing the least used one or more of the reference symbols from the second symbol dictionary to generate a third symbol dictionary without the removed the least used one or more reference symbols.

27. A computer readable recording medium containing computer readable codes as a program to execute a method in a text image coding and decoding system, the method comprising:
decomposing image data to extract a stripe image having one or more symbols;
matching the symbols with reference symbols of a symbol dictionary;
generating one or more new symbols when the one or more new symbols of the symbols are not included in the symbol dictionary; and
removing the least used one or more of the reference symbols, so that the symbol dictionary is updated as an updated symbol dictionary with the one or more new symbols and without the least used one or more reference symbols.

28. A computer readable recording medium containing computer readable codes as a program to execute a method in a text image coding and decoding system, the method comprising:
- decomposing image data to extract a stripe image having one or more symbols;
- matching the symbols with reference symbols of a symbol dictionary;
- generating one or more new symbols when the one or more new symbols of the symbols are not included in the symbol dictionary;
- removing the least used one or more of the reference symbols, so that the symbol dictionary is updated as an updated symbol dictionary with the one or more new symbols and without the least used one or more reference symbols;
- receiving index information on the updated symbol dictionary from which the least used one or more of reference symbols have been removed, and location information on the respective symbols of the stripe image; and
- forming the stripe image according to the index information on the updated symbol dictionary and the location information on the respective symbols of the stripe image.

29. A computer readable recording medium containing computer readable codes as a program to execute a method in a text image coding and decoding system, the method comprising:
- decomposing image data to extract a stripe image having one or more symbols;
- matching the symbols with reference symbols of a symbol dictionary; and
- generating one or more new symbols when the one or more new symbols of the symbols are not included in the symbol dictionary;
- updating the symbol dictionary as a second symbol dictionary with the one or more new symbols; and
- removing the least used one or more of the reference symbols from the second symbol dictionary to generate a third symbol dictionary without the removed least used one or more reference symbols.

30. An apparatus usable in a text image coding and decoding system, comprising:
- a decomposer to decompose image data to extract a plurality of stripe images each having one or more symbols;
- a matching unit to match the symbols of the respective stripe images with reference symbols of a symbol dictionary;
- a dynamic symbol caching unit to update the symbol dictionary as an updated symbol dictionary to include the symbols of the respective stripe images, and to remove the least used one of the reference symbols from the updated symbol dictionary to reduce a volume of the updated symbol dictionary.

31. An apparatus usable in a text image coding and decoding system, comprising:
- a decomposer to decompose image data to extract a plurality of stripe images each having one or more symbols;
- a matching unit to match the symbols of the respective stripe images with reference symbols of a symbol dictionary;
- a dynamic symbol caching unit to update the symbol dictionary as an updated symbol dictionary to include the symbols of the respective stripe images, and to remove the least accessed one of the reference symbols from the updated symbol dictionary according to the updated symbol dictionary memory.

32. An apparatus usable in a text image coding and decoding system, comprising:
- a decomposer to decompose image data to extract a plurality of stripe images each having one or more symbols and access information corresponding to the respective symbols;
- a matching unit to match the symbols of the respective stripe images with reference symbols of a symbol dictionary;
- a dynamic symbol caching unit to cache the symbols to update the symbol dictionary as an updated symbol dictionary to include the symbols of the respective stripe images as the reference symbols of the updated symbol dictionary, to remove the least accessed one of the reference symbols from the updated symbol dictionary, and to update the access information of the symbols of the updated symbol dictionary according to overlap of the symbols of the respective stripe images and the reference symbols of the symbol dictionary, such the updated access information is used to remove the least accessed one of the reference symbols.

33. An apparatus usable in a text image coding and decoding system, comprising:
- a control unit to determine the least used one or more reference symbols of a symbol dictionary; and
- a dynamic symbol caching unit to generate one or more new symbols when the one or more new symbols of the symbols are not included in the symbol dictionary, and to remove the least used one or more of the reference symbols as determined by the control unit, so that the symbol dictionary is updated as an updated symbol dictionary with the one or more new symbols and without the least used one or more reference symbols.

* * * * *

UNITED STATES PATENT AND TRADEMARK OFFICE
CERTIFICATE OF CORRECTION

PATENT NO.           : 7,724,164 B2
APPLICATION NO.      : 11/626522
DATED                : May 25, 2010
INVENTOR(S)          : Hyung-Soo Ohk et al.

It is certified that error appears in the above-identified patent and that said Letters Patent is hereby corrected as shown below:

On the Title page, Section (73) Assignee should read as follows: Samsung Electronics Co., Ltd. - Suwon-si, Republic of Korea; and Purdue Research Foundation - West Lafayette, Indiana Signed and Sealed this
Twenty-first Day of June, 2011

David J. Kappos
*Director of the United States Patent and Trademark Office*